United States Patent
Messinger-Rapport

(10) Patent No.: US 6,755,478 B2
(45) Date of Patent: Jun. 29, 2004

(54) COMBINED DEVICE FOR A FRONTALLY HINGED WHEELBARROW AND GARDENING CART

(76) Inventor: Kenneth H. Messinger-Rapport, 5600 Hawthorne Dr., Highland Heights, OH (US) 44143

( * ) Notice: Subject to any disclaimer, the term of this patent is extended or adjusted under 35 U.S.C. 154(b) by 0 days.

(21) Appl. No.: 10/260,649

(22) Filed: Sep. 30, 2002

(65) Prior Publication Data

US 2004/0061372 A1 Apr. 1, 2004

(51) Int. Cl.[7] .................................................. B62B 1/18
(52) U.S. Cl. ...................... 298/3; 298/1 C; 280/47.31; 280/47.32
(58) Field of Search .............................. 298/3, 2, 1 C, 298/17 R; 276/3; 280/47.31, 47.32, 47.3, 78, 47.18, 47.19, 79.3

(56) References Cited

U.S. PATENT DOCUMENTS

| | | | |
|---|---|---|---|
| 855,309 A | * | 5/1907 | Heineman |
| 879,861 A | * | 2/1908 | Ferguson |
| 4,589,508 A | * | 5/1986 | Hoover et al. ............. 180/19.1 |
| 5,121,970 A | | 6/1992 | Andersen |
| D337,409 S | * | 7/1993 | Maple et al. ................ D34/27 |
| 5,318,315 A | | 6/1994 | White |
| 5,415,421 A | * | 5/1995 | Godwin .................... 280/47.31 |
| 5,687,979 A | | 11/1997 | Plevka |
| 5,833,250 A | | 11/1998 | Schier |
| 5,957,352 A | | 9/1999 | Gares |
| 6,193,265 B1 | * | 2/2001 | Yemini ..................... 280/47.31 |
| 6,318,808 B1 | * | 11/2001 | Shayne ..................... 298/17 R |
| 6,508,478 B1 | * | 1/2003 | Ortez ....................... 280/47.34 |
| 6,520,513 B2 | * | 2/2003 | Presley-Mays ........... 280/47.19 |
| 2002/0113389 A1 | | 8/2002 | Robinson |

* cited by examiner

Primary Examiner—D. Glenn Dayoan
Assistant Examiner—H. Gutman
(74) Attorney, Agent, or Firm—Watts Hoffmann Co., L.P.A.

(57) ABSTRACT

A combined device is designed for multiple purposes including: hauling and dumping, bagging lawn and garden debris, and simultaneously carrying gardening tools and supplies. The device includes a wheelbarrow device with a container that lifts from its rear and flips forward from a horizontal position to beyond vertical about a pivot point elevated by supports or braces such that the combined device can remain level with the ground while it is being emptied and thereby the combined device can stably maintain a load of gardening tools and supplies.

11 Claims, 5 Drawing Sheets

COMBINED DEVICE FOR A FRONTALLY HINGED WHEELBARROW AND GARDENING CART

CROSS-REFERENCE TO RELATED APPLICATIONS

Not Applicable

BACKGROUND

1. Field of Invention

Figure 1:
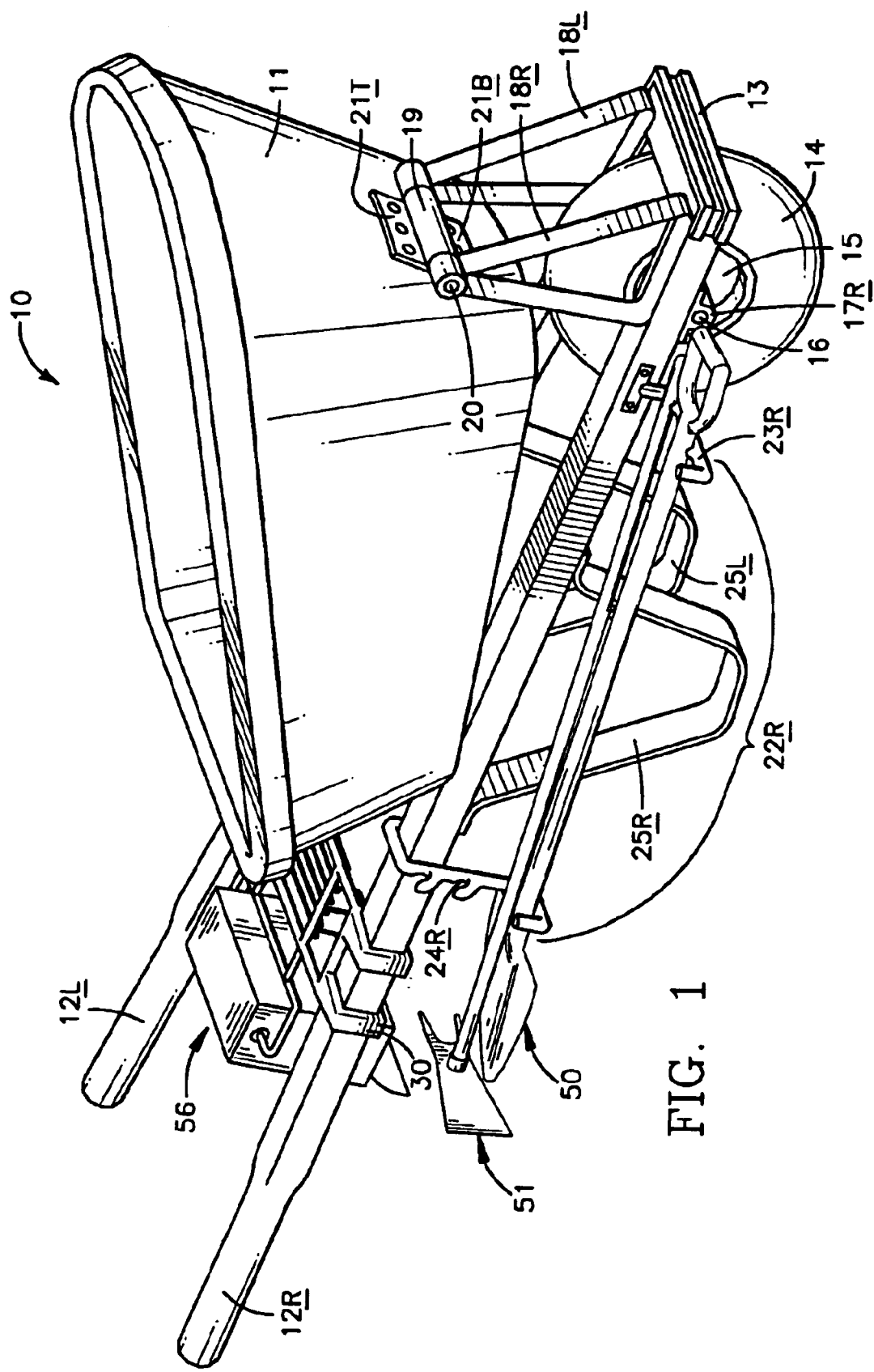

This invention relates generally to wheelbarrows and to gardening carts; and in particular to a combination device derived from the wheelbarrow and the gardening cart comprising a frontally hinged wheelbarrow designed for bagging yard debris while at the same time remaining level with the ground, so that it can stably maintain a load of gardening tools and lawn supplies like a gardening cart.

2. Description of Prior Art

Wheelbarrows are a common, and some may say, indispensable device for yard work and gardening. The ancient wheelbarrow may have been invented first in China as long as 1,500 years ago. Yet, over all that time the basic utilitarian design of the conventional wheelbarrow has not significantly changed. All modern wheelbarrows, like all prior wheelbarrows, are effectively designed for hauling and dumping by taking advantage of the leverage of two parallel poles attached to the underside of a tub, or container. The poles, converging upon a fulcrum generally consisting of an axle-mounted wheel or sometimes resting in front upon just a simple post, the leverage of the two poles underneath the container allows a person to lift a far greater weight of material than he or she could normally lift if left to their arms, legs, and back alone. Yet, despite the far greater advantage in leverage that the wheelbarrow provides, lifting a fully loaded wheelbarrow still requires considerable effort and brute strength. This is the result of several flaws inherent to the conventional design. First, conventional design maintains an attachment of the poles, container, and associated parts altogether, with the wheel as fulcrum close to the ground using it as the pivot point. Such conventional designs or even some modified designs that pivot from the wheel and thus require raising the most of the wheelbarrow i.e. its frame, poles, container and associated parts, off of the ground require a person to lift their materials plus the weight of the wheelbarrow itself, which altogether is a far greater weight than should be necessary to accomplish the same work. Secondly, since the poles, container, and wheel all remain securely connected to one another, the wheelbarrow, other than the wheel, must be lifted up and over along a wide arc in order for the wheelbarrow to be entirely emptied. In the conventional wheelbarrow design when the frame and container are attached a person has to shift his or her grip from the top to the bottom of the handle-ends while maintaining his or her balance and control over their load. As a result, conventional wheelbarrow design, which is still in widespread use, can be difficult, clumsy, and even hazardous to operate.

Furthermore, attempting to empty grass clippings and gardening debris from a wheelbarrow of such conventional design and especially trying to dump such debris into a plastic trash bag, as is often necessary or convenient to do these days is really nearly impossible. Lifting the rear of the wheelbarrow off the ground while holding the trash bag in place while sliding the collected debris into a bag, all without spilling everything on to the ground, is a feat more demanding than most people can manage. Simply put, conventional wheelbarrow design has not kept pace with or adapted to accommodate the physical needs of most homeowners, or to the realities of modern trash disposal.

Another major problem with the conventional wheelbarrow is the difficulty or impracticality of carrying tools or useful supplies. At least two prior patents: U.S. Pat. No. 5,957,352 to Gares; and, U.S. Pat. No. 5,687,979 to Plevka, have been issued for tool holding devices designed to attach directly to the wheelbarrow. However, because emptying a wheelbarrow with these devices attached would necessarily either drastically shift or spill any tools or supplies attached to such racks, neither of these previously patented devices allows for dumping while these devices are in use; which is a significant flaw in both patents. Possibly as a result of this fact all manufacturers of tool carrying devices, of which I am aware, have separated their product from the wheelbarrow resulting in an entirely separate category of yard product known as a lawn caddy, or gardening cart. Unfortunately this means that anyone wishing the convenience of having their tools and supplies nearby while needing the functionality of a wheelbarrow must push or tow both their gardening cart and their wheelbarrow around their yard as they do their chores. And they would still face the disadvantages inherent to the conventional wheelbarrow design while of course the gardening cart can neither haul nor dump gardening material or debris.

Pending patent application No.: 20020113389 describes a modified conventional wheelbarrow design which is intended to ease the burden of dumping the conventional wheelbarrow. The solution it proposes however is much more limited in scope relative to the combined device in this application, since, as described, it could neither carry tools nor be used to bag yard debris. It is further alleged in the former application that some prior art includes wheelbarrow designs that leave the frame resting on the ground, as is the case herein. Repeated searches of U.S. patent records, however, have revealed no such designs. Whatever defects those other designs may have they are not shared by the present invention. The lifting leverage provided in the present combined device more than suffices for all of the purposes and objects stated for this invention. In comparison with any design that relies on the low fulcrum position of the wheel, and in which the component parts remain altogether attached, the combined device operates far more easily for its intended purposes than those designs can possibly permit.

In summation, given its multiple purposes, this design for a combined device is significantly broader in scope and operation than can be claimed for any mere conventional wheelbarrow, modified wheelbarrow, utility cart, garden cart, or lawn caddy alone.

SUMMARY

The solution for combining the functions of a wheelbarrow together with a lawn caddy into one convenient device that preserves and enhances the functionality of both devices has remained unsolved until now. The invention combines the functional utilities of a wheelbarrow and a lawn caddy into one convenient, highly efficient, easy to use unit that has the added purpose of being specifically designed to facilitate bagging of grass clippings and gardening debris.

OBJECTS AND ADVANTAGES

The combined device performs the functions of a conventional wheelbarrow and of a gardening cart while enhancing the functionality of both. It hauls and dumps like a wheelbarrow while simultaneously it holds and carries a plurality of tools like a gardening cart. A list of the primary objects and advantages of the combined device are as follows:

1) The combined device incorporates adjustable tool racks for carrying both long handled gardening tools such as rakes, and hoes; and, for carrying relatively shorter tools such as pitchforks and shovels.
2) The combined device incorporates a tool tray and basket racks for carrying various hand tools such as clippers and trowels, and gardening supplies, such as gloves and water bottles.
3) The combined device incorporates a towel rack device for hanging a roll or box of plastic trash bags.
4) The combined device incorporates a container device specifically designed to allow for fitting a plastic trash bag over it so that debris from the container can be easily emptied into the plastic trash bag.
5) The combined device utilizes an elevated pivot point for its fulcrum, which allows its container to be emptied without having to lift the entire wheelbarrow frame off the ground.
6) The elevated pivot point produces a forward flipping action which reduces the effort involved in dumping the container.
7) The elevated pivot point produces a forward flipping action that allows a person to easily and accurately dump yard debris into a plastic trash bag fitted over the front of the container of the combined device.
8) The elevated pivot point produces a forward flipping action which reduces the difficulty and hazard, as compared with conventional wheelbarrow design, of dumping heavy loads of gardening materials such as mulch, or top soil.
9) The elevated pivot point which produces a forward flipping action enables a gardener to empty the container of yard debris, or to dump a heavy load of loose material, while maintaining their load of tools and since the pole frame of the combined device remains on the ground.
10) The combined device increases a gardener's efficiency because it eliminates their need to employ both a wheelbarrow and a gardening cart; it reduces their need to make repeated trips back to the tool shed or garage to get tools or supplies; and it allows them to easily collect and to bag their yard and gardening debris without spilling it everywhere or requiring the assistance of a helper.
11) The combined device can be constructed from readily available materials and standard components.
12) The combined device could be mass-produced with existing production methods, using standard materials therefore at a reasonable cost.

Further objects and advantages will become apparent from a consideration of the ensuing description and drawings.

DRAWING FIGURES

Figure 2:
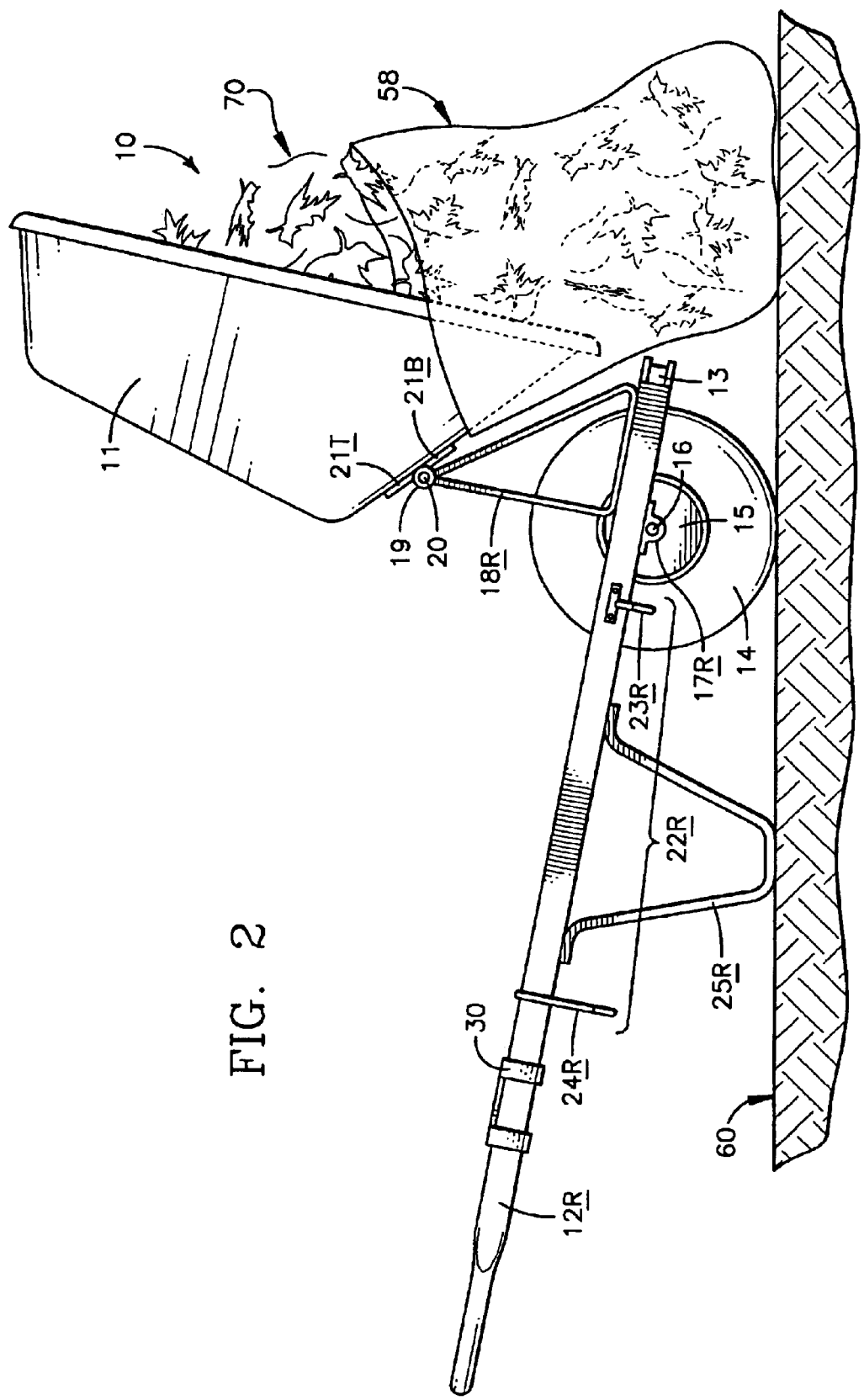
Figure 3:
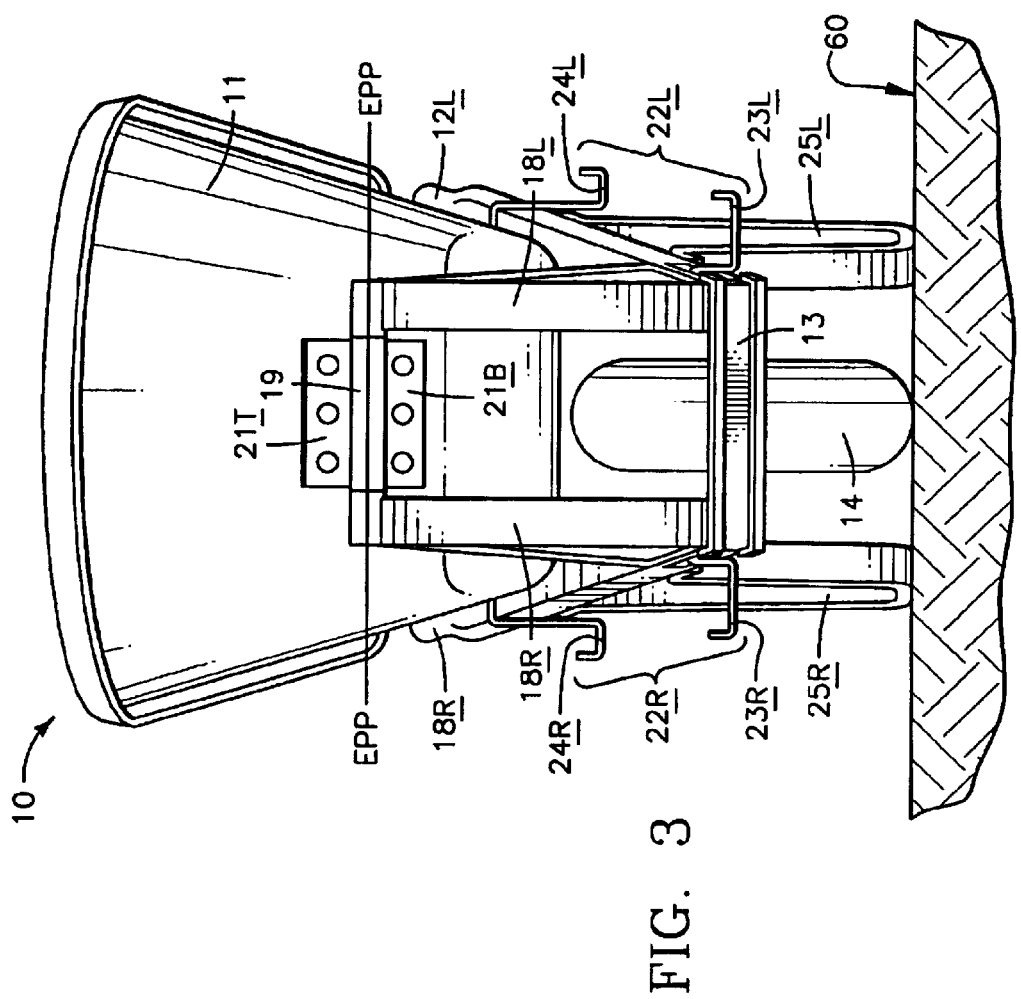
Figure 4:
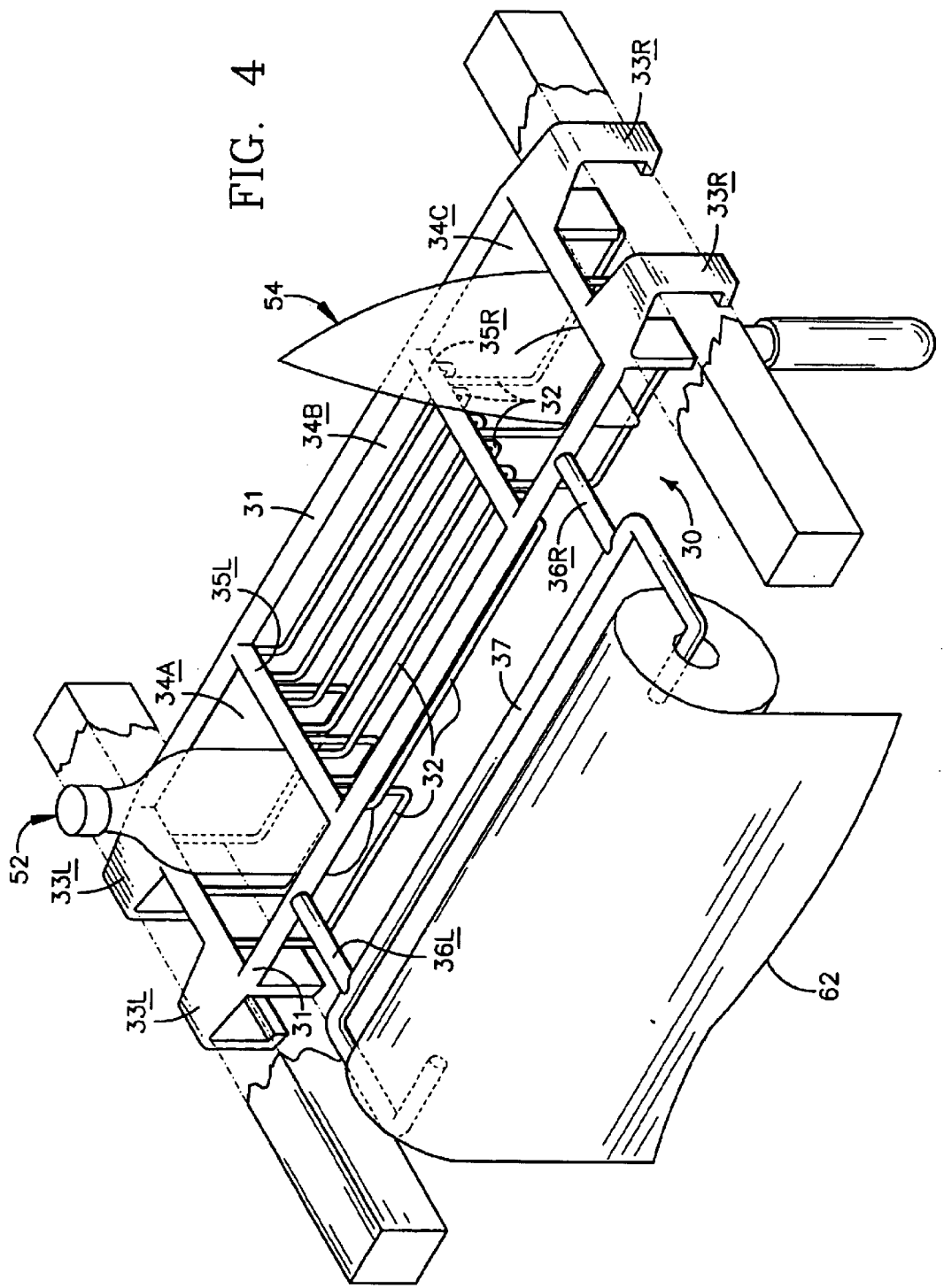
Figure 5:
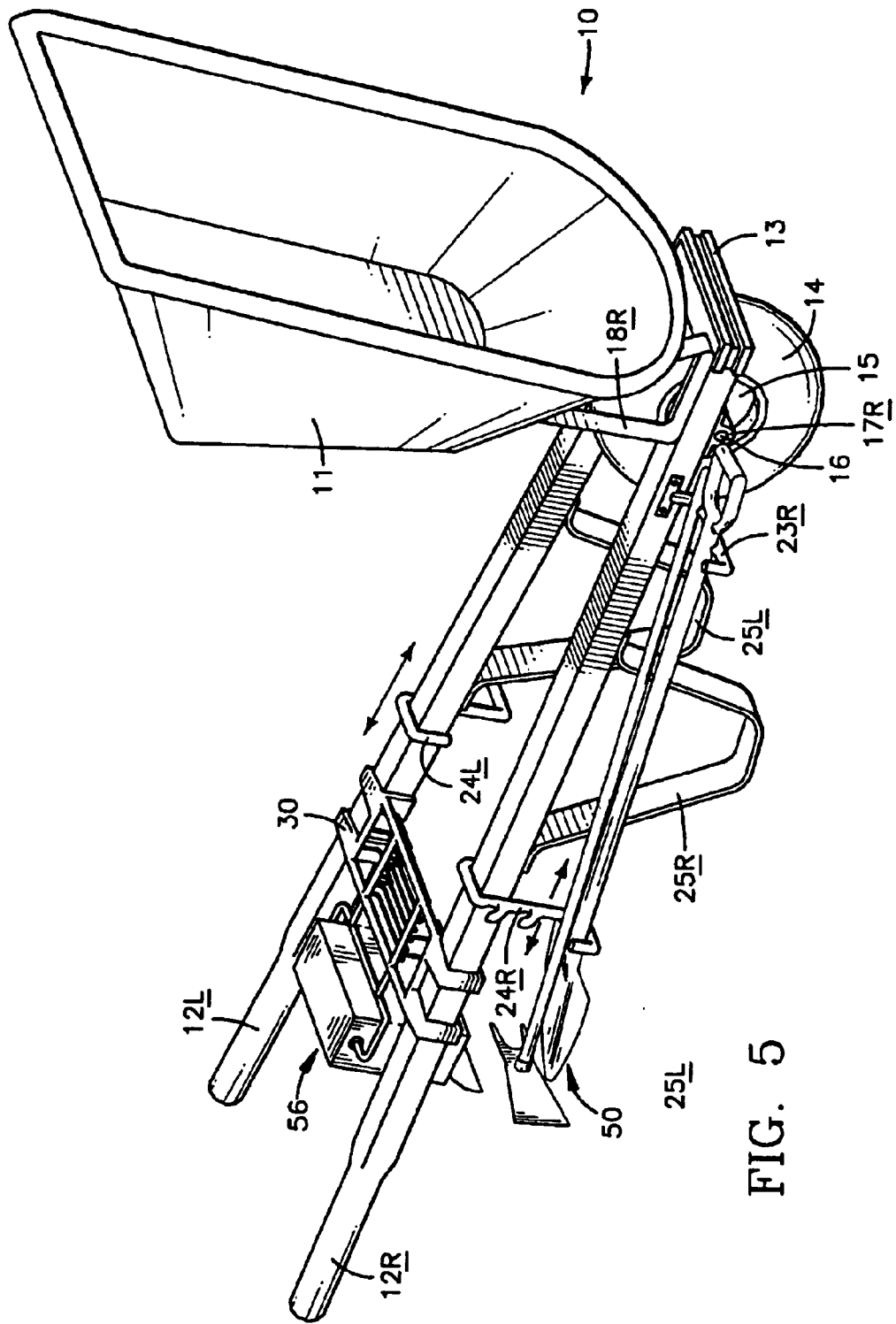

The following lists the five drawings that illustrate the combined device:

FIG. 1 illustrates an overall view of the combined device.
FIG. 2 illustrates the combined device being emptied.
FIG. 3 illustrates the elevated pivot point.
FIG. 4 illustrates the rear tool tray and trash bag holder.
FIG. 5 illustrates the combined device frame remaining stable while the container is being emptied.

REFERENCE NUMERALS IN DRAWINGS

10 the preferred embodiment
11 container
12R, 12L wooden poles
13 front steel brace
14 tire
15 hub
16 axle
17R Right U brace (left U brace not shown)
18R, 18L hinge braces
19 hinge
20 hinge pin
21T, 21B hinge flange
EPP elevated pivot point
22R, 22L adjustable side tool racks
23R, 23L front fixed brackets
24R, 24L rear adjustable tool brackets
25R, 25L footers
30 rear tool tray and trash bag holder
31 molded plastic top, or, frame
32 steel wire bottom
33R, 33L end clips
34A, 34C wire basket rack
34B tray
35R, 35L dividing posts
36R, 36L support posts
37 trash bag holder
50 lawn or garden tool, namely a spade
51 lawn or garden tool, namely a hoe
52 lawn or garden supply, namely a bottle containing a liquid
54 lawn or garden tool, namely a garden trowel
56 lawn or garden supply, namely a box of trash bags
58 lawn or garden supply, namely a trash bag
60 a surface, namely a top surface of a lawn or garden
62 lawn or garden supply, namely a roll of trash bags
70 yard debris

DETAILED DESCRIPTION OF PREFERRED EMBODIMENTS

The combined device will now be described with reference to the accompanying drawings in which a preferred embodiment of the invention is shown. This combined device may, however, be embodied in many different forms and should not be construed as limited to the embodiments set forth herein; rather these embodiments are provided so that this disclosure will be thorough and complete, and will fully convey the scope of this invention to those skilled in the art of building such equipment. Like numbers refer to like elements throughout.

Dimensions where given in the following description are given both in centimeters and in inches. They are offered to enhance the description by providing a sense of relative proportion as needed. They should not be taken as fixed, and alternative embodiments of the combined device could have significantly different dimensions.

Construction materials for the combined device consist of wood, steel, plastics, rubber, and vinyl-covered steel-wire; and, will be indicated further herein depending upon the part. Parts and components of the preferred embodiment of the combined device might also be constructed satisfactorily out of alternative materials depending upon the part.

Referring to FIG. 1, the preferred embodiment consists of a plastic tub or container 11 supported generally from a frame constructed out of two wooden poles, 12R, 12L having square cross sections but being rounded at their ends so as to provide comfortable handholds. The container 11 as illustrated is fashioned from plastic through a molding process but could also be stamped out of steel. The container in the preferred embodiment has a capacity of 8 cubic feet.

The poles 12R, 12L are joined at their front ends by a steel brace 13 that is produced by metal stamping. The steel brace 13 induces an angle of separation between the two poles such that when viewed from above the poles form a shape generally consistent with the letter "V", at an angle of separation not more than 20°. In all cases, except where otherwise specified, component parts of the combined device are secured to each other using a variety of sizes and lengths of nuts, bolts, and metal washers inserted through aligned holes as would be familiar to a person skilled in the art of assembling gardening equipment.

Referring to FIG. 1, a freely rotatable, inflated rubber tire 14 mounted on a steel hub 15 is suspended on an steel axle 16, supported by two steel "U" braces bolted onto the underside of each pole 15.24 cm (6") behind the front brace 13. A right "U" brace 17R is best shown in FIG. 1. An essentially identical left "U" brace (not shown) is mounted on the opposing side of the wheelbarrow.

Referring to FIGS. 1 and 3, 4 cm (1.5") behind the front brace 13 two triangular steel hinge braces 18R, 18L are bolted to the top of each pole. In the preferred embodiment these hinge braces 18R, 18L support the ends of the tubular portion of a steel hinge 19 through which a steel hinge pin 20 is horizontally seated. The hinge 19 is attached to the lower front portion of the container 11 by two opposing flanges 21T, 21B. The height of the hinge braces 18R, 18L and the point of attachment of the hinge flanges 21T, 21B to the bottom front of the container 11 allow the bottom edge of the container 11 to be elevated 5 cm (2") above the top of the tire 14. The dashed line in FIG. 3 denoted as EPP, shows the elevated pivot point that results from this construction.

FIG. 2 illustrates the elevation of the pivot point that allows the container 11 to be flipped up and over on its pivot point, which is a hinge in the preferred embodiment, without coming into contact with the tire 14.

Again referring to FIG. 1, the adjustable tool racks 22R, 22L are installed on each side of the preferred embodiment underneath the container 11 extending outward from the sides of the poles 12R, 12L. The adjustable tool rack 22R can be seen in FIG. 1 carrying a shovel; adjustable tool rack 22L is shown in FIG. 3 only. In the preferred embodiment these tool racks consist of two brackets each, a front fixed bracket 23R, 23L and an adjustable rear bracket 24R, 24L positioned serially as 23R, 24R and 23L, 24L.

FIG. 1 shows the adjustable tool rack 22R on the right side of the preferred embodiment of the combined device. As illustrated the front bracket 23R consists of a 1 cm (⅜ths") steel rod, selected for strength and durability and sheathed in a roughened vinyl coating to resist rust and reduce scratching when metal tools are laid on the metal bracket. The front bracket 23R in FIG. 1 is bolted through the side of pole 12R, at a point 25.4 cm (10") from the front brace 13 through holes that align with holes in a transverse flange situated on one end of the front bracket 23R. In an alternate embodiment the front brackets 23R, 23L may be threaded on one end like a screw, and screwed into the wood of the poles 12R, 12L. On the end opposite from the flanged end, the steel rod is bent upward so as to provide a stop in order that tools resting on the bracket do not slide off when the combined device is moved about. Alternative embodiments of the front brackets 23R, 23L could incorporate ridges for preserving the separation of tools in transport, or brackets angled up slightly to secure tools more firmly to the side of the combined device. In the preferred embodiment, however, the horizontal extension of the front brackets 23R, 23L is not angled but is level with the ground; and, measures 18 cm (7") that is sufficiently wide to allow the handle ends of long handled tools to rest easily and stably in that space.

Because the pole frame of the wheelbarrow inclines upward from front to back, and because the frame is narrower in the front than in the rear, several adjustments must be made in the form and configuration of the adjustable tool racks 22R, 22L for them to work properly. First, because of the incline, the front brackets 23R, 23L are positioned lower and closer to the ground relative to the rear adjustable brackets 24R, 24L. Accordingly, in order to keep tools relatively level during transport, the rear adjustable brackets 24R, 24L must have a longer vertical drop to compensate for the difference in elevation from front to back. Notwithstanding that, the rear adjustable brackets 24R, 24L should still ride slightly higher than the front brackets so that the implement end of the tools will ride higher off the ground in order to avoid touching the ground as the wheelbarrow is rolled around through a typically uneven lawn or garden. Second, because the pole frame is significantly narrower in front than in the rear, the front bracket must have a longer horizontal extension in order to keep tools from angling inward against the front tire 14. This also allows more space to carry the implement end of tools on the front brackets 23R, 23L at a safe distance from the front tire 14, if one should choose to do so, although that is not the recommended or preferred embodiment.

The front brackets 23R, 23L are fixed in place whereas the rear brackets 24R, 24L have hooked tops which allow them to be moved freely along the length of the poles 12R, 12L; hence, allowing the tool racks to be fully adjustable depending upon the length of the tools that need to be carried.

By-passing for the moment the wheelbarrow's steel footers 25R, 25L; FIG. 1 illustrates the rear adjustable bracket 24R, which is placed in the figure behind the rear end of the container 11 and in front of the rear tool tray and trash bag holder 30. As seen in FIGS. 1 and 5 the rear adjustable brackets 24R, 24L can be positioned anywhere along the entire length of a pole 12R, 12L depending upon the length of the tool to be carried. A rear adjustable tool bracket could be fashioned in many ways, but in the preferred embodiment 24R, and 24L are made from 1 cm (⅜ths") steel rod that is bent at its upper end at right angles to form a square-shaped hook. As shown in FIGS. 1 and 5 the top of the rear adjustable bracket 24R forms a hook just large enough to fit snuggly around the squared sides of the pole 12R so as to allow for the free placement of the rear bracket 24R at any point along the length of the wheelbarrow pole. As illustrated the rear bracket 24R consists of a ⅜ths" steel rod, for strength and durability, sheathed in a roughened vinyl coating, to resist rust and reduce scratching when metal tools are laid on the metal bracket. The vertical length of the rear brackets 24R, 24L, in the preferred embodiment is 20 cm (8") or roughly eight times the vertical drop length of the front brackets 23R, 23L. This length differential is necessary, as previously explained, because of the incline of 10° to 15° from the front of the wheelbarrow pole frame to its rear. In order to compensate for this incline and maintain a relatively level plane for carrying long handled tools the rear brackets 24R, 24L must have a relatively longer vertical extension than the front brackets 23R, 23L while still maintaining a slight upward grade in order to maintain the elevation of the implement end of tools as they are being transported, as shown in FIGS. 1 and 5. Also, in the preferred embodiment the horizontal length of 10 cm (4") at the bottom of the rear brackets 24R, 24L, is sufficiently wide to hold and support either the implement or the handle ends of a variety of long handled garden tools, although in the preferred embodiment, the implement end should rest on the rear brackets 24R, 24L as shown by the dashed-in shovel in FIG. 1. The tail end of the rear tool brackets 24R, 24L, is bent upward in order to provide a stop so that the tools stay on the rack while the wheelbarrow is rolled around over a lawn or through a garden.

Alternative embodiments of the rear brackets 24R, 24L could incorporate ridges for preserving the separation of tools in transport, or brackets angled up slightly to secure tools more firmly to the side of the downward extension of the rear bracket.

Returning now to the wheelbarrow's support footers 25R, 25L, which are standard in all wheelbarrows; the two steel support footers 25R, 25L are formed in the approximate shape of a flat-bottomed "U" but are designed to be longer in the back so as to impart a 10° to 15° incline of the pole frame in the wheelbarrow. In the preferred embodiment the support footers 25R, 25L, are secured by a series of aligning holes, bolts, washers, and nuts to the underside of the poles 12R, 12L, but are not secured to the container 11 itself. Unlike in all other conventional wheelbarrows, the support footers 25R, 25L in the preferred embodiment of the combined device do not attach in any manner to the bottom of the container 11. This leaves the container 11 free, which allows it to be emptied by flipping it over the elevated pivot point as shown in FIGS. 2 and 5. Rather than having to lift and dump the entire wheelbarrow, container, frame and all, emptying debris into trash bags from this combined device is simple and virtually effortless.

FIG. 4 illustrates separately the rear tool tray and trash bag holder 30. As shown in FIGS. 1 and 5 in the preferred embodiment it is mounted directly behind the container 11, in front of the pole handles. Preferably the rear tool tray and trash bag holder 30 will be composed of a molded plastic top 31 and a vinyl-covered, steel-wire bottom 32. The top 31 serves as a frame for the rear tool tray and trash bag holder 30. The steel-wire bottom inserts into this frame and as such, in the preferred embodiment, it consists of the following: two wire basket-racks 34A, and 34C, one each on opposite ends of the tool tray and trash bag holder; one wire tray 34B, in the middle in-between the two baskets; two sets of end clips 33R, 33L, on the outside ends of the frame 31; and, one bag holder 37, in the rear of the tool tray and trash bag holder 30.

In the preferred embodiment the top 31 forms a rectangular frame with two transverse dividing posts 35L, and 35R that establish three openings 34A, 34B, and 34C. The middle opening, 34B is wider than the two end openings 34A and 34C in order to provide space in the middle for a shelf or tray. In the preferred embodiment the wire bottom 32 is fashioned into two wire basket-racks separated by a shallower wire tray that will be inserted into pre-cast holes in the underside of the top 31.

As shown in FIG. 4, altogether the arrangement of the rear tool tray and trash bag holder would be suitable for carrying a variety of small hand tools such as a spade, a pair of pruning shears, or a water bottle; as well as room on the tray for a pair of gloves or a portable radio.

Extending to the rear from the rectangular top plastic frame 31 would be a trash bag holder 37 composed of steel-wire in the preferred embodiment; but which could also be constructed out of wood, or plastic in alternative embodiments. In all cases it would be designed so as to be an incomplete rectangle that produces thereby two opposing posts onto which a roll of plastic trash bags, or a box of trash bags can be mounted for convenient access. In the preferred embodiment, the rear trash bag holder 37 is attached by screws to the top frame 31, being screwed from the inside of the frame 31 into one end of each of two support posts 36L, and 36R, which then is welded to the rear trash bag holder 37.

In the preferred embodiment the rectangular top 31 is molded from plastic. In alternative embodiments other materials for the top 31 could be used such as steel, steel-wire, or wood. Plastic however has the inherent advantage of being malleable and elastic. The preferred embodiment takes advantage of this elasticity in that, extending from the sides of the top frame 31, four squared off plastic clips 33R, 33L allow the rear tool tray and trash bag holder 30 to be clipped over the sides of the poles 12R, 12L as shown in FIGS. 4 and 5.

Operation—FIGS. 1,2,4,5

The combined device 10 as described above in the preferred embodiment operates well in any gardening season. On lawn mowing day, the grass needs cutting, the shrubs need trimming, and the garden beds need weeding. Depending on the size of the yard and the equipment available to do the various jobs this work could take from two to six hours or more. In the spring when the grass is long and in the fall when the lawn is covered with leaves it is normally better to catch the grass rather than to mulch it. Some people prefer to catch their grass all of the time since it makes the lawn look neater. Most lawn mowers come with grass catchers. Almost universally they are difficult to empty, and nearly impossible to empty directly into a plastic bag. But with the combined device 10 practically any grass catcher can be emptied directly into the open-topped container 11. Once the container 11 is full, a plastic lawn bag taken from the conveniently handy trash bag holder dispenser 37 (FIG. 4) on the back of the combined device, can be fitted over the front end of the container 11 (FIG. 2). Holding the bag in place with one or both hands, all a person need do is pull the rear rim of the container forward towards himself. The container will flip up and over on its elevated pivot point EPP (FIG. 3) and all of the grass will slide smoothly, without a spill, directly into the bag as shown in FIG. 2. The bag can then be tied up, and dropped into the container 11 for transporting to the curb for disposal.

After the mowing is finished, trimming and weeding can follow. The conveniently provided adjustable and fixed tool racks, trays, and basket racks permit the user to keep a variety of tools such as shears, trimmers, trowels, rakes, shovels, and etc. close at hand thereby reducing the need to make extra trips to the tool shed or garage. Even a water bottle can be fitted into the rear basket-racks 34A, 34C for convenience.

The combined device with tools and supplies can be transported wherever it is needed. Since tools hang near the frame the combined device fits through any door or passageway that an ordinary wheelbarrow or garden cart can pass through.

As yard work proceeds the container 11 is filled with debris. When it is full it can be simply and neatly emptied into a bag without having to unload a single tool or supply from the racks. Everything stays in place since the poles, to which the tool racks 22L, 22R, 30 attach, remain level with the ground while the container is being emptied (FIG. 2).

The combined device is also conveniently designed for planting and mulching days. It has sufficient room in its container 11 to carry as many as six flats of flowers, or up to six one to two gallon containers of perennials, or more than a dozen small pots of individual plants. As the plants go into the ground, leftover plastic pots and containers can go back into the container 11 to be bagged for recycling.

Mulch or topsoil as well may be sitting in a pile at the side of the driveway. It can be shoveled into the combined device and hauled to any part of the yard to be precisely deposited simply by flipping the container 11 forward and dumping it above the spot where the mulch is needed. Given the adjustable tool rack, a gardener can then spread their mulch without having to run off for a rake.

Conclusion, Ramifications, and Scope of Invention

From this description the combined device's advantages over both the conventional wheelbarrow and the lawn caddy become evident:

1) The combined device can carry a plurality of useful tools and supplies simultaneously as it hauls and dumps.
2) The combined device is specifically designed to enable a single operator to bag grass clippings and garden debris neatly and easily without need of an assistant.
3) The combined device's ability to neatly and easily bag grass clippings and gardening debris works ideally with the practical realities of current trash disposal procedures which often require bagging of yard debris.
4) The elevated pivot point of the combined device reduces the amount of effort needed to empty a wheelbarrow as compared with the effort required in using a conventional wheelbarrow.
5) Dumping loads of mulch or topsoil from the elevated pivot point of the combined device is easier and less hazardous than dumping such loads using a conventional wheelbarrow.
6) The improved ease and accuracy of dumping works well also with the present practice of composting as an alternative to trash disposal.
7) The ease, convenience, and neatness of bagging yard debris and finishing cleanup when using the combined device significantly reduces the amount of time required for completing yard and gardening chores.
8) The combined device, which can carry gardening tools and supplies of varying lengths, shapes and sizes; can still fit through doorways or narrow spaces because when loaded up, tools ride close to the frame and within the width of the top of the container 11.
9) Because the combined device's container can be emptied while the invention's wheel and footers remain on the ground, its poles remain level; and therefore, tools and supplies do not have to be unloaded and reloaded every time the combined device needs to be emptied.
10) The manufacture of the combined device may use common materials and standard production methods, meaning that greatly improved functionality can be obtained at a reasonable cost.
11) Furthermore, because the combined device can be constructed and produced out of a wide range of materials and by various production methods, it could be efficiently manufactured by whatever means proves to be least expensive, most available, and least destructive to the environment.

In summary, the combined device performs the basic functions of a wheelbarrow and a lawn caddy while enhancing the functionality, convenience, and efficiency of both devices.

While the above description of the combined device contains many specifications, these should not be construed as limitations on the scope of the combined device. Many variations are possible. For example, in the above-described embodiment bolts and nuts attach all of the component parts; but, in an alternative embodiment the various non-adjusting racks, braces, and shelves could be integrated into the frame using welds, metal casting, or plastic molding processes. In addition, other features could be added to improve convenience and use. For example, handgrips could be incorporated into the rim of the container; a wider multi-wheeled transport system could be incorporated into the device to increase stability or lower or raise the device relative to the ground as desired. Furthermore, certain bracing units, brackets, clips and the like might be added to improve load management and stability during hauling and dumping.

An alternative design concept for the elevated pivot point comprises either means installed underneath the container, or, installed along the outer sides of the container device using triangular shaped braces to interlock with a dowel mechanism, or connect to a post extending from the side of the container using a c-clamp design, thus obviating the need for a frontal hinge. Thus the combined device is not limited to the illustrated embodiment but may successfully be embodied through a variety of configurations.

The scope of the combined device should be determined by the following claims and their legal equivalents, rather than strictly by the examples already given.

In the drawings and specification there have been disclosed typical preferred embodiments of the invention and, although specific terms are employed they are used in a generic and descriptive sense only and should not be construed so as to limit the scope of the present invention as set forth by the following claims.

The invention claimed herein is as follows:

1. A lawn and garden device combining a wheelbarrow device with a gardening cart device having a container for hauling or dumping debris or loose material,
   a frame for supporting said container from underneath, and a wheel connected to said frame in a manner that renders said lawn and garden device mobile across a surface, wherein the improvement comprises:
   a) holding means attached to said frame for carrying a plurality of lawn and gardening tools and supplies;
   b) a fulcrum device connected to said container by an attaching means in a manner that allows said container to be pivoted over said fulcrum device for said debris or loose material from said container to be directed into a means for disposing of debris; and
   c) elevating means whereby said fulcrum device attaches by said attaching means to said frame in a manner that permits said holding means to remain stable and level with said surface while said container is being emptied whereby a plurality of lawn and gardening tools or supplies mounted on said holding means stay in place as the lawn and garden device is being emptied;
   d) wherein said container is shaped in a manner that permits said means for disposing of debris to be fitted snuggly around an opening of said container such that said means for disposing of debris can be filled with the debris or loose materials of said container when said container is pivoted over said fulcrum device;
   e) wherein said frame comprises longitudinal supports or poles aligned in a substantially horizontal manner and in turn support said wheel in a manner that enables said lawn and garden device to be rolled about said surface and, by supporting footers, separate from said wheel, which further support said poles substantially horizontally in a generally inclining manner from front to rear;

f) wherein said holding means for carrying a plurality of lawn and gardening tools comprise a multiple rack or bracket or support device arranged to attach and to connect to an outward facing side of said poles and in so doing maintain, hold, or carry lawn and gardening tools of various lengths in a manner parallel with said poles at a height sufficient to maintain adequate clearance of said tools above said surface;

g) wherein said holding means for carrying a plurality of lawn and gardening tools further comprise said multiple rack or bracket or support device of sufficient width and strength to support either a handle end or an implement end of the lawn or gardening tool;

h) wherein said multiple rack or bracket or support device is fixedly attached to said poles at the front end of said poles, near the wheel, and adjustably connected to said poles at the rear or near the back end of said lawn and garden device in a manner that will permit said holding means to be moved longitudinally along said poles in order to accommodate the tools of varying lengths.

2. A lawn and garden device as defined in claim 1 further comprising a pivot hinge assembly supported above said poles and said wheel, and attached to said container above said poles and above said wheel in a manner that permits said container to be pivoted over said pivot hinge assembly thereby flipping said container from horizontal to vertical with respect to said surface.

3. A lawn and garden device as defined in claim 2 wherein said pivot hinge assembly is elevated such that the plurality of lawn and gardening tools being carried on said tool holding means remain stable and generally level with respect to said surface while said container is being dumped or emptied.

4. A lawn and garden device as defined in claim 3 comprising a tray and basket rack device containing slots, trays, or cavities susceptible of receiving by insertion, supporting in a shelf-like manner, holding or otherwise generally securing in a non-attaching manner said lawn and gardening tools and supplies in a manner sufficient to hold said tools or supplies in place while said lawn and garden device is either being rolled around said surface or being emptied.

5. A lawn and garden device as defined in claim 4 further comprising said tray and basket rack device attaching to said poles at the back end of said lawn and garden device, behind said container, and further attaching thereto by means of clipping devices extending from either side of said tray and basket rack device in a manner that snaps at least a portion of said clipping devices around the top and sides of said poles.

6. A lawn and garden device as defined in claim 5 further comprising a bag holding device, extending rearward from said tray and basket rack device in a manner that permits said bag holding device to maintain for dispensing from a roll or a box, trash bags as may be used with the container.

7. A lawn and garden device comprising:

a) a container for carrying, hauling, and dumping debris or loose landscaping materials having a rear section;

b) a frame and wheel supporting said container in a manner that allow said container to be movably pushed across a surface;

c) a pivoting device connecting said frame to said container in a manner that permits said container to be inclined from said rear section forward in an arching manner, said manner sufficient to essentially empty said container;

d) tool racks connected to said frame for holding or carrying a variety of gardening tools and supplies, said tool racks comprising:
   i) a front rack incorporated therein by molding or welding and shaped with notches for carrying the gardening tools; and
   ii) a rear rack correspondingly notched with said front rack;
   iii) wherein said front rack and said rear rack are connected to said frame in a manner that allows said rear rack to be moved and secured at varying positions along said frame in a manner that allows said front and rear racks to carry tools of varying lengths; and e) means for supporting said pivoting device in a manner that permits said container to be inclined from said rear section to be emptied while said frame, said wheel, and said tool racks remain stable and level with respect to said surface.

8. The lawn and garden device of claim 7 wherein said container comprises an open end shaped in such a manner as may be fitted into a garbage disposal receptacle.

9. The lawn and garden device of claim 7 wherein said frame incorporates the pivoting device for emptying said container of the debris or loose landscaping material in a manner permitting said frame to remain stationary so that said front rack and said rear rack, and said tools mounted thereon remain stable and stationary.

10. A lawn and garden device as defined in claim 9 further comprising an implement holding device containing slots, trays, or cavities susceptible of receiving by insertion, supporting in a shelf-like manner, holding or otherwise generally securing in a non-attaching manner a plurality of lawn and gardening tools or supplies in a manner sufficient to hold said tools or supplies in place while said lawn and garden device is either being rolled around said surface or being emptied.

11. A lawn and garden device as defined in claim 10 further comprising a holding device, said holding device comprising two opposing "L" brackets mounted to said implement holding device for supporting a roll or box of garbage bags in a manner that permits the dispensing of said bags for use with the container.

* * * * *